(12) United States Patent
Dureau (10) Patent No.: US 6,513,160 B2
(45) Date of Patent: *Jan. 28, 2003

(54) SYSTEM AND METHOD FOR PROMOTING VIEWER INTERACTION IN A TELEVISION SYSTEM

(75) Inventor: Vincent Dureau, Palo Alto, CA (US)

(73) Assignee: OpenTV, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,703

(22) Filed: Jun. 17, 1998

(65) Prior Publication Data

US 2002/0056094 A1 May 9, 2002

(51) Int. Cl.7 .............................. H04N 9/00; H04N 7/16
(52) U.S. Cl. .............................. 725/9; 725/24; 725/131; 725/139; 725/151; 725/47; 463/40
(58) Field of Search .............................. 725/9, 724, 32, 725/42, 60, 121, 122, 131, 139, 151, 35, 46, 47; 345/440, 473; 463/40, 42; H04N 9/00, 7/173, 7/10, 7/025, 5/445; G06F 3/00, 13/00

(56) References Cited

U.S. PATENT DOCUMENTS

| 5,589,892 A | * 12/1996 | Knee et al. ................... 725/43 |
| 5,805,763 A | * 9/1998 | Lawler et al. ................. 386/83 |
| 5,995,134 A | * 11/1999 | Hayashi ....................... 725/116 |

FOREIGN PATENT DOCUMENTS

| EP | 0 513 553 | 11/1992 |
| EP | 0 659 018 | 6/1995 |
| EP | 0 670 652 | 9/1995 |
| EP | 0 680 214 | 11/1995 |
| EP | 0 711 076 | 5/1996 |

OTHER PUBLICATIONS

International Search Report for Application No. PCT/US 99/10075 mailed Aug. 12, 1999.

* cited by examiner

Primary Examiner—Andrew Faile
Assistant Examiner—Andrew Y. Koenig
(74) Attorney, Agent, or Firm—B. Noël Kivlin; Rory D. Rankin (57) ABSTRACT

An interactive television system configured to display an animated character which has an appearance indicative of a viewer's interaction and time spent watching a particular television program. In one embodiment, the character is a genie which appears more healthy when the viewer's watching/interaction increases and less healthy when it decreases. Various features of the genie, such as hair color, clothing and name, are viewer-selectable. The genie may prompt the viewer for responses, which responses result in the awarding of points to the genie, which in turn make it appear more healthy or give it certain powers or characteristics. The genie is implemented in an interactive application which is transmitted to a set-top box coupled to the viewer's television. Transmission of related data through a return path to the broadcast station which originated the application enables the viewer to participate in lotteries and other special promotions.

67 Claims, 7 Drawing Sheets

SYSTEM AND METHOD FOR PROMOTING VIEWER INTERACTION IN A TELEVISION SYSTEM

BACKGROUND OF THE INVENTION

1. Field of the Invention

The invention relates to interactive television systems and more particularly to means for inserting interactive content into television programs through applications executed in the set-top box of a television system.

2. Description of the Related Art

The emerging technology of interactive television systems holds a promise of allowing a television set to provide various new means for marketing products and services to viewers. Interactive television systems are typically capable of displaying text and graphic images to facilitate interaction with a user in addition to the normal video associated with a television program stream. Proposed features of interactive television accommodate a variety of marketing, entertainment and educational capabilities such as allowing a user to interact with television programs by ordering advertised products or services, competing against contestants in a game show, or requesting specialized information regarding a particular program.

Typically, the interactive functionality is controlled by a set-top box connected to the television set. The set-top box receives television programs and interactive applications through typical broadcast channels, such as cable television (CATV) or direct satellite broadcasts. The interactive application may be designed to function in response to signals in the broadcast or actions taken by the viewer. The interactive functionality is displayed upon the television set screen and may include icons or menus to allow a user to make selections via the television's remote control.

It is desirable in the marketing of products or services to maximize the amount of time which a viewer spends watching a particular program associated with the marketed products or services. Manufacturers and service providers advertise during television programs in an attempt to reach the greatest possible number of viewers. These advertisements are designed to attract and retain the attention of viewers, usually within a given demographic.

It is highly desirable in the marketing of products and services, as well as in the marketing of individual television programs, to be able to utilize the functionality of interactive television systems to attract and retain the viewer's attention. Interactive functionality in a television system helps further marketing goals by allowing the viewer to participate in the advertisement or television program. Because the viewer must pay attention to the televised material in order to interact, the interactive functionality of a television system provides means by which the viewer can be encouraged to watch and listen to the television programs and advertisements and thereby increase his or her exposure to the marketing material.

There are various examples of interactive applications which are directed toward marketing products and services to consumers. One example is a televised buying service in which a series of products are displayed through a television program and the viewer utilizes the interactive functions of the television system to purchase the displayed products. Another example is an interactive game show in which a viewer watches studio contestants participate while various graphics are displayed to present questions or possible responses to the viewer. The viewer may interact by using a remote control to register responses within the set-top box, or the response of the user may be communicated to a service provider via a modem connection or other suitable means.

The types of interactive programs described above may be directed to particular demographic groups among television viewers. More particularly, they may be directed to older viewers who are likely to watch game shows or who can purchase the advertised products. There are some viewers, however, who are less likely to be interested in these types of shows and who may therefore be less likely to be influenced by the associated interactive applications. Children, for example, generally are not authorized to use televised buying services, and may not be interested in the subject matter of a game show designed for adults. As a result, they may not be affected by these types of interactive television marketing. It would therefore be highly desirable to design a new means to utilize the interactive functionality of a television system which is more likely to attract such viewers.

SUMMARY OF THE INVENTION

The problems outlined above are in large part solved by a system and method for promoting viewer interaction in a television system in accordance with the present invention. One embodiment of the inventive system and method comprises an interactive television system which displays a genie associated with a particular channel or program. The genie reacts to certain actions taken by the user and prompts the user to provide responses or take certain other actions. The genie may require that the user periodically tune in to the associated television program or channel to keep the genie from getting sick or experiencing other undesirable effects. The user may control certain characteristics of the genie, such as the way it dresses, and the characteristics of the genie may in turn affect the future actions of the genie. The genie may be used in certain promotions, such as a lottery in which the broadcast service provider selects and retrieves the genie of a particular user so that the genie can be displayed in a broadcast. The user whose genie was so selected could then contact the broadcast service provider to receive a prize.

The viewer's interaction may range from simply watching a television program to actively providing input to the system. In one embodiment, the system comprises a set-top box which is configured to execute an interactive application responsive both to signals conveyed with a television program and to inputs from the viewer. The application is configured to display the customizable genie character described above on the television screen. The genie is generally representative of the overall level of the viewer's interaction with the television program and the associated application.

The method and apparatus are intended to increase the likelihood that viewers in the targeted demographic groups will watch television programs and/or advertisements and participate in associated promotions. Accordingly, the method in its broadest sense encompasses the broadcast of a program from a remote station to a broadcast station operated by a broadcast service provider which in turn broadcasts the program to a viewer. Typically, an interactive application is time-multiplexed into the television program transmission by the broadcast service provider and both the program and the application are transmitted to a set-top box in the home of the viewer. The application is received and executed by the set-top box, which also stores data reflecting the viewer's viewing history. Based upon the viewing history data, the application generates a cartoon character such as a genie in the television display. The characteristics of the genie are therefore maintained even though the application may be transient. Some of the characteristics of the genie character, such as clothing and hair color, may be customizable by the viewer while other characteristics, such as the health of the genie, are controlled by the application. The application-controlled characteristics of the genie may be dependent upon the viewing history data, and are designed to encourage viewing of the associated programs and advertisements and participation in the associated promotions.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
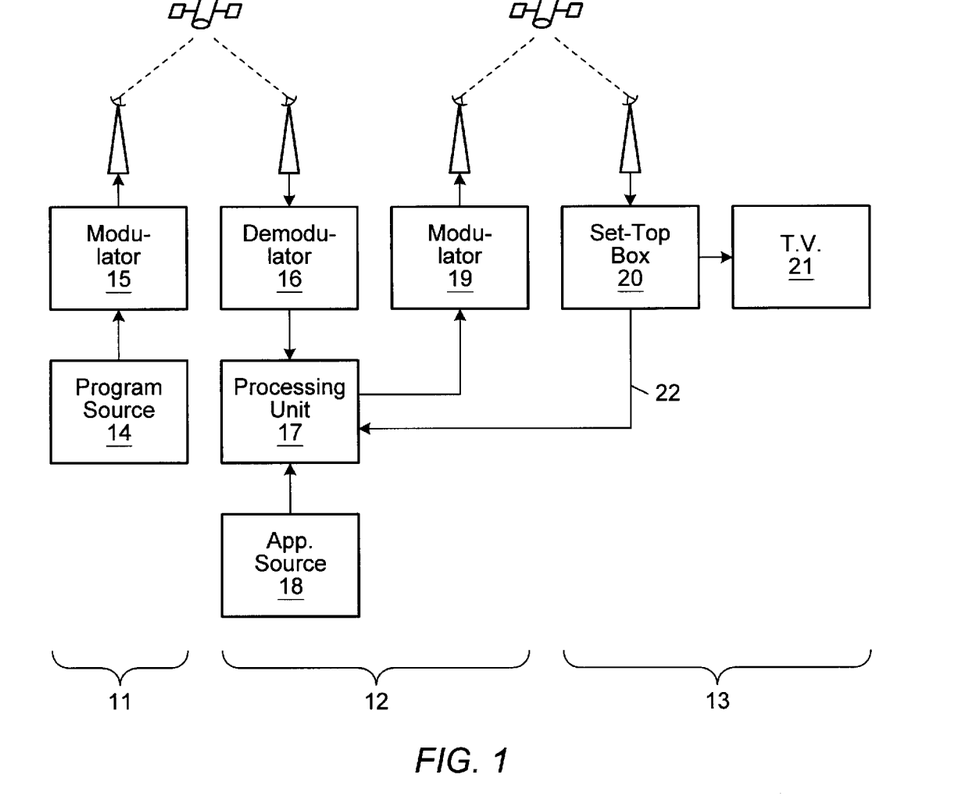
FIG. 1 is a block diagram illustrating the broadcast chain by which the television program and the application are delivered to the viewer.

Referring now to FIG. 1, a block diagram illustrating one embodiment of a broadcast chain from a remote station to a viewer's television is shown. A remote station 11 is shown transmitting a signal to broadcast station 12, which then transmits a signal to receiving station 13. Remote station 11 includes a program source 14 which generates a television program and a modulator 15 which converts the television program into a signal for transmission to broadcast station 12. The television program is typically a network television broadcast, but can be any of a number of program types, such as taped shows, live broadcasts, advertisements and the like. The figure depicts a free-space transmission via a communications satellite, but it is contemplated that any known means for supplying a program to the broadcast station may be used. In fact, the remote station is not a necessary part of the system, but is shown as a reference to indicate a typical source of a television program to the broadcast station.

Broadcast station 12 includes a demodulator 16 which converts the signal received from the remote station to a signal which can be manipulated by processing unit 17. Broadcast station 12 also includes application source 18, which provides the interactive application to processing unit 17. Processing unit 17 combines the application and the television program for transmission to the receiving station 13. In one embodiment, the application and television program are combined into a single signal through time-multiplexing, but this can be accomplished by any of a number of methods, such as frequency-multiplexing or transmission over separate channels. This signal is also typically compressed at broadcast station 12 in order to conserve broadcast bandwidth. The combined signal is then converted by modulator 19 into a transmission signal and conveyed to receiving station 13. Broadcast station 12 is typically operated by a broadcast service provider such as a CATV service operator or a direct satellite service operator. Again, the depiction of the transmission as a free-space transmission via communications satellite is intended to be exemplary rather than limiting.

Receiving station 13 includes set-top box 20 and television 21. Although the term "set-top box" is used herein, it is understood that this term refers to any processing unit for receiving and processing a transmitted signal and conveying the processed signal to a television or other monitor. The set-top box may be in a housing which physically sits on top of a television, it may be in some other location external to the television (e.g., on the side or back of the television or remotely located from the television), or it may be incorporated into the television itself. Set-top box 20 serves to demodulate the signal received from broadcast station 12 and to separate the application from the television program. The set-top box executes the application and combines the audio and video portions of the television program with video and/or audio generated by the application, as required by the application. The modified television program signal is then passed on to television 21. Television 21 may be a television or a video monitor employing any suitable television format (e.g., NTSC or HDTV), or it may be replaced by other devices, such as a video recorder. Receiving station 12 may also include a return path 22. Return path 22 may be utilized by an application to provide data to the broadcast service provider. The return path is commonly a modem within the set-top box connected to a standard telephone line. A corresponding modem at the broadcast station is also connected to the telephone line to receive data from the receiving station.

Figure 2:
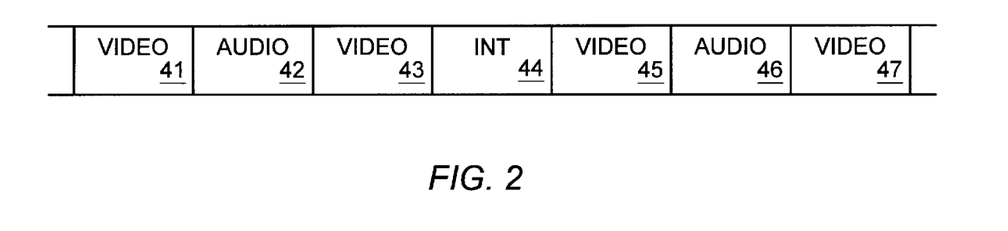
FIG. 2 is a diagrammatic representation of a time multiplexed signal transmitted from the broadcast station to a receiving station.

Referring to FIG. 2, a diagrammatic representation of the signal transmitted from broadcast station 12 to receiving station 13 is shown. This figure shows the manner in which packets of compressed audio 42, 46, compressed video 41, 43, 45, 47 and compressed interactive application 44 are time multiplexed to form the transmitted signal. Each packet includes header information and data information to enable reconstruction of the three portions of the signal into separate signals. It can be seen from the figure that there are typically more packets of video data 41, 43, 45, 47 than audio data 42, 46 or interactive application data 44 as a result of the greater amount of video data which typically must be transmitted.

Figure 3:
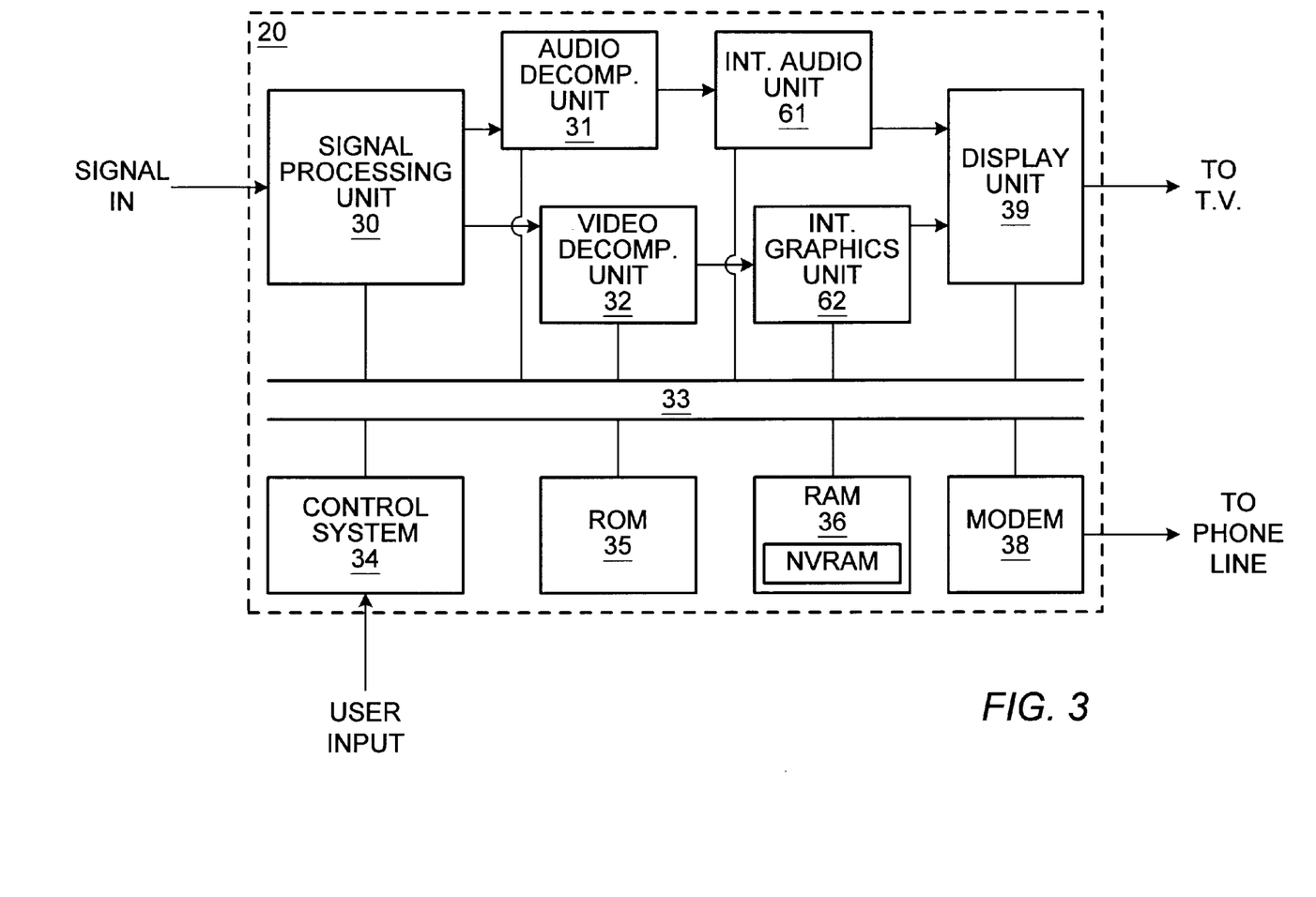
FIG. 3 is a block diagram of the set-top box which receives the multiplexed television program and application.

Referring to FIG. 3, a block diagram of a set-top box 20 is shown. The various components of the set-top box are each coupled to system bus 33 and are configured to receive control signals from control system 34. It is contemplated that these and the other components of the set-top box may also be directly interconnected or consolidated into one or more physical units, as a matter of design choice. It is also contemplated that the functions of the set-top box components may be distributed among the components in a manner different from that described herein, as a matter of design choice.

Typically, the audio/video stream is compressed prior to transmission by broadcast station 12 using a compression algorithm such as one of the Motion Picture Expert Group (MPEG) compression standards. The transmission signal from broadcast station 12 is received at receiving station 13, which is typically a home equipped with a set-top box 20 and a television 21. The transmission signal is fed to set-top box 20 and input to signal processing unit 30. Signal processing circuit 30 breaks down the transmission signal into component parts such as the audio portion of the signal, the video portion of the signal and the interactive application which was injected into the signal at the broadcast station prior to transmission. The audio portion of the signal is routed to audio decompression unit 31. Audio decompression unit 31 then reconstructs the audio portion of the television program. The video portion of the signal is routed to video decompression unit 32, where the video portion of the television program is reconstructed. The outputs of audio and video decompression units 31, 32 are connected to interactive audio unit 61 and interactive graphics unit 62, respectively. Interactive graphics unit 62 overlays the interactive graphics generated by the interactive application onto the broadcast video and routes the combined video to display unit 39. Interactive audio unit 61 combines the audio generated by the interactive application with the broadcast audio and directs the combined audio to display unit 39, which formats the audio and video signals and produces an output signal for a television.

In addition to separating the audio and video portions of the television program from the transmission signal, signal processing unit 30 separates the interactive application from the transmission signal and routes the application to control system 34. Control system 34 is configured with a microprocessor (not shown) and is coupled to read-only memory (ROM) 35 and random-access memory (RAM) 36 through system bus 33. When the set-top box is turned on, control system 34 executes operating system code which is stored in ROM 35. The operating system code of the set-top box executes in the same manner as the operating system code of a typical personal computer (PC) and enables the set-top box to perform interactive functions through the execution of application code. The set-top box also includes modem 38, which provides a return path by which viewer data can be transmitted to the broadcast station.

One embodiment of the invention is designed to operate in an environment in which the software that generates the interactive character is not always executing. In other words, the application is transient. This may be a result of the set-top box not being turned on, or it may result from the set-top box being tuned to a channel not associated with the interactive character. It may also be the case that several interactive applications are broadcast and each generates the character, but one application may terminate before the next is executed. The application code need not be resident in the set-top box and it is contemplated that the code is cyclically broadcast to the set-top box and downloaded if the set-top box is tuned to the proper channel. When the transmission signal received by set-top box 20 contains application code, the application code is separated from the compressed audio and video and conveyed to RAM 36. The operating system code of set-top box 20 is configured to execute ("launch") application code when it is received from signal processing unit 30. RAM 36 includes non-volatile random access memory (NVRAM) 37. Application code is preferably stored in volatile RAM. NVRAM 37 preferably stores data which is intended to be used within the application and stored after execution of the application (e.g. user-defined characteristics of the interactive character.) Application code and data may nevertheless be stored in other locations or devices in alternate embodiments.

Interactive applications periodically require that the audio and video portions of the television program be combined with interactive graphics and/or audio before they are transmitted to television 21. Control system 34 may therefore transmit control signals to interactive audio and graphics units 61, 62 in order to combine the audio and video of the television program with the interactive audio and video for output to display unit 39 and television 21. The function of combining of the audio and video of the interactive application and the television program may be allocated to the interactive audio and graphics units 61, 62, the display unit 39, the decompression units 31, 32, the control system 34, or one or more other processing units, depending on the design of the particular set-top box. The interactive applications may also occasionally prompt the viewer for input, so the set-top box may conveniently be configured with a receiver to enable it to receive commands or other input from a remote control.

One embodiment of the inventive interactive system is directed toward increasing the viewership of children's television programs. Because children may be more likely to interact with a cartoon-type character, particularly one which represents a living entity, the interactive application is designed to generate such a character. More particularly, in one embodiment the character is a genie. The interactive application is configured to display the genie character superimposed on a portion of the television screen so that the viewer can simultaneously watch the television program and interact with the genie, thereby increasing the program's viewership. The genie character may appear or disappear, it may shrink or grow, it may be movably animated or stationary, or it may behave in any manner calculated to increase the interest of the targeted viewer.

Figure 4A:
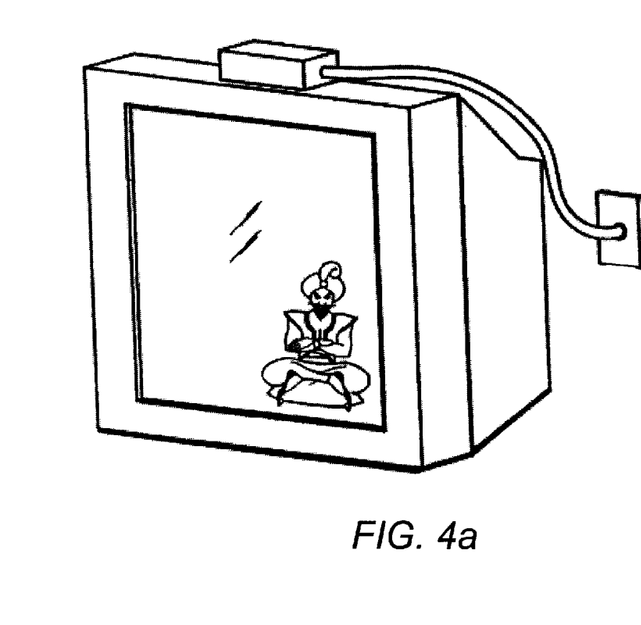
FIGS. 4a–4d are illustrations of several states of an adaptable genie character.
Figure 4B:
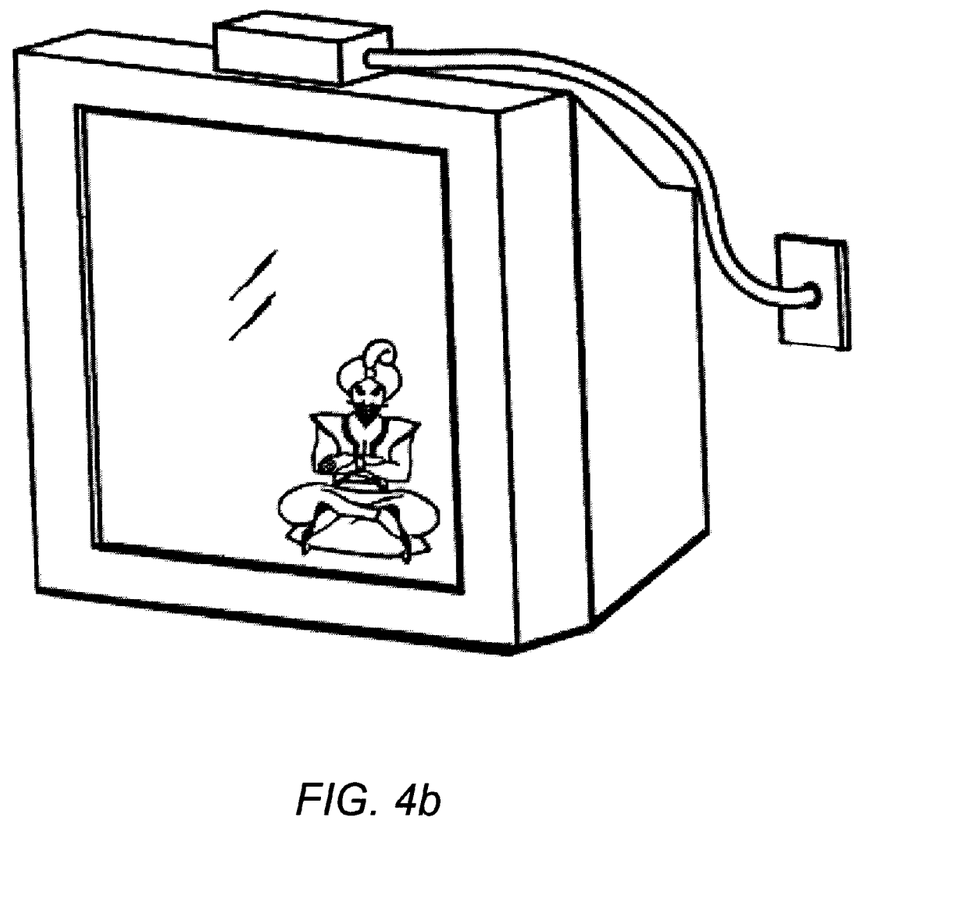
Figure 4C:
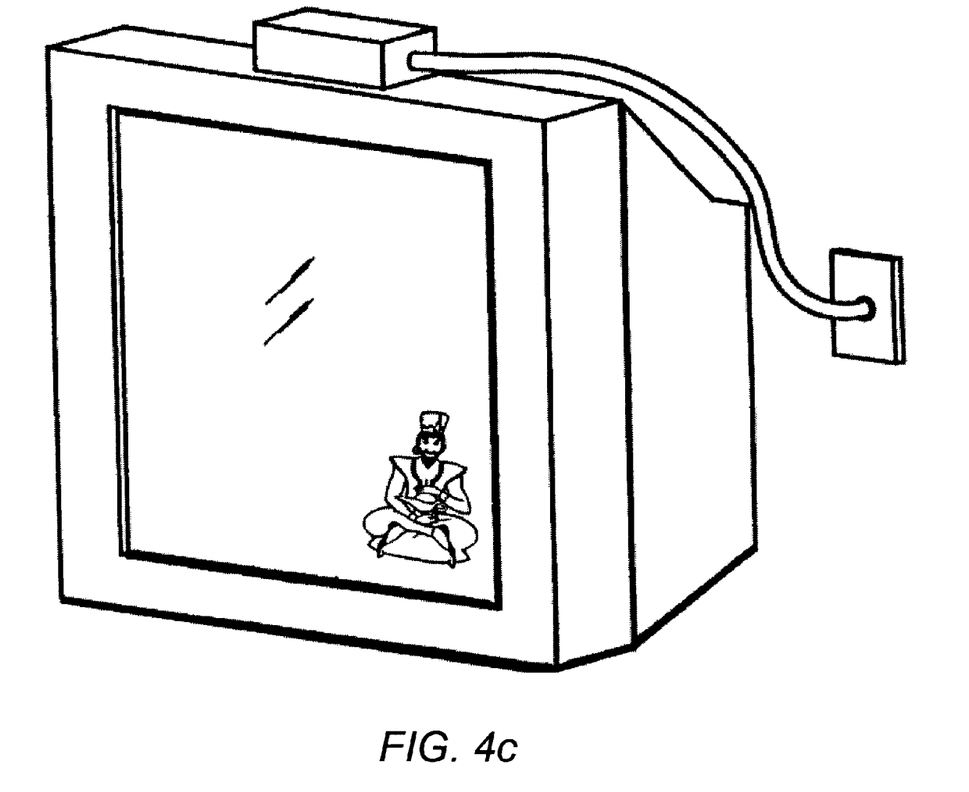
Figure 4D:
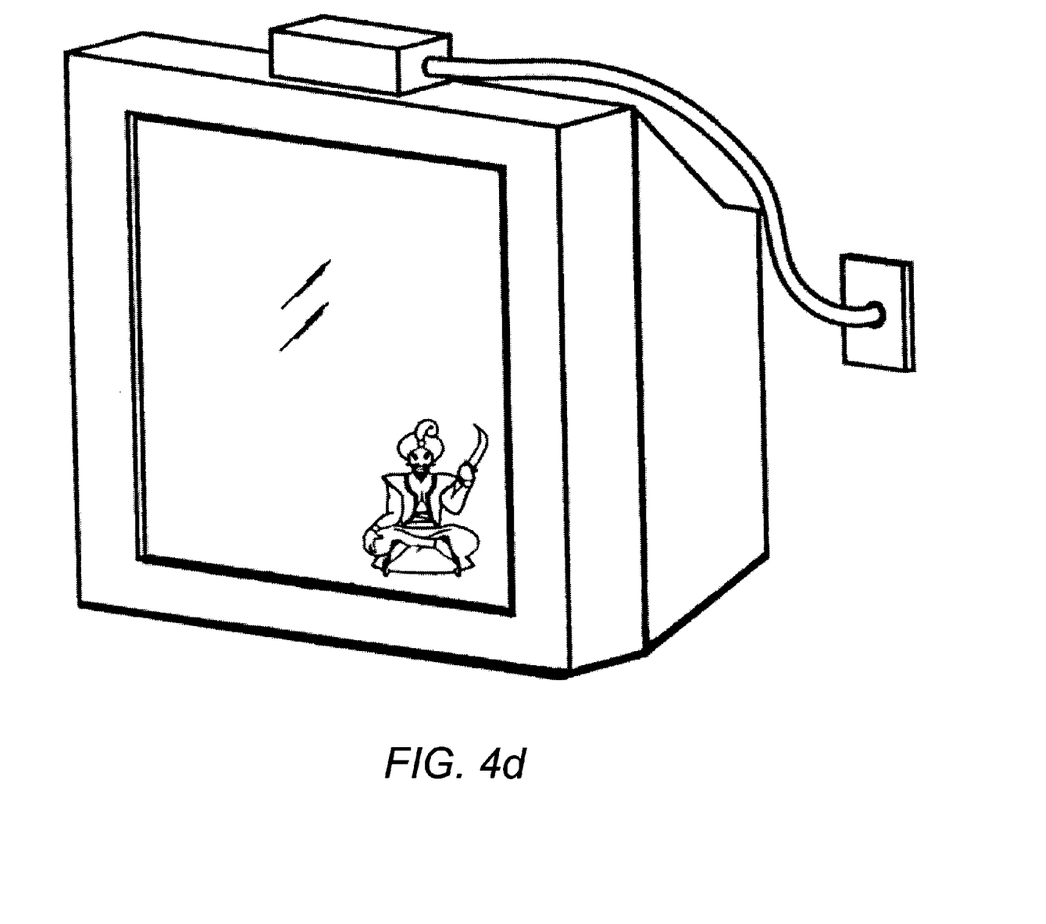

FIGS. 4a–4d illustrate one embodiment in which a genie character is superimposed on a corner of a television display. FIG. 4a illustrates a viewer interacting with the television system via remote control input to the set-top box. The genie in this figure is displayed in a preferred state, as indicated by the healthy, robust appearance and smiling face of the genie. In FIG. 4b, the genie is displayed in a less preferred state, indicated by the thinner, less healthful appearance and frowning face. FIG. 4c illustrates different clothing which the viewer can select in setting up the genie. FIGS. 4c and 4d depict articles (e.g., lamp and sword) which the genie may possess. These articles may be selectable by the viewer or, alternatively, they may be displayed by the interactive means as an indication of special powers obtained by the genie or status levels which have been reached by the genie.

The interactive application is configured to vary the appearance and actions of the genie to reflect the "health" of the character, which is in turn dependent upon the time the viewer spends watching the associated program and/or the interactivity of the viewer with the program. This viewing information is stored in a data file in the set-top box. When the application is executed, this data file is read into the application and modified according to the viewer's viewing history and participation. In one embodiment, the viewer is required to tune in to the associated program or channel to maintain the health of the genie. This may be implemented by comparing the current date with the last viewing date and then comparing the elapsed time with a predetermined value or range of values. If the elapsed time is greater than the predetermined range, the character is made to appear less healthy. If the elapsed time is less than the predetermined range, the character is made to appear more healthy. Because the health of the genie is dependent upon viewing time and participation, the viewer is encouraged to watch the associated program and interact with the application in order to maintain the health of the genie character.

The interactive application is associated with a particular television program and is intended to increase the viewership of that program. The application, as referred to herein, is contemplated to include one or more applications which are configured to access the same file containing the data which defines the characteristics of the viewer's genie. In one embodiment, several different applications are transmitted to the set-top box at different times, thereby allowing the genie's behavior to be varied, while still maintaining certain characteristics which are defined by the data file. For example, during a commercial, the viewer may be prompted to click where the genie is hiding in the video, but during a game show, the genie may track the viewer's score as the viewer plays along with the game. These different applications are transmitted to the viewer's set-top box whenever the applications are to be executed. The applications can be broadcast before or simultaneously with an associated program and they may be conveyed in single or continuous transmissions.

Figure 5:
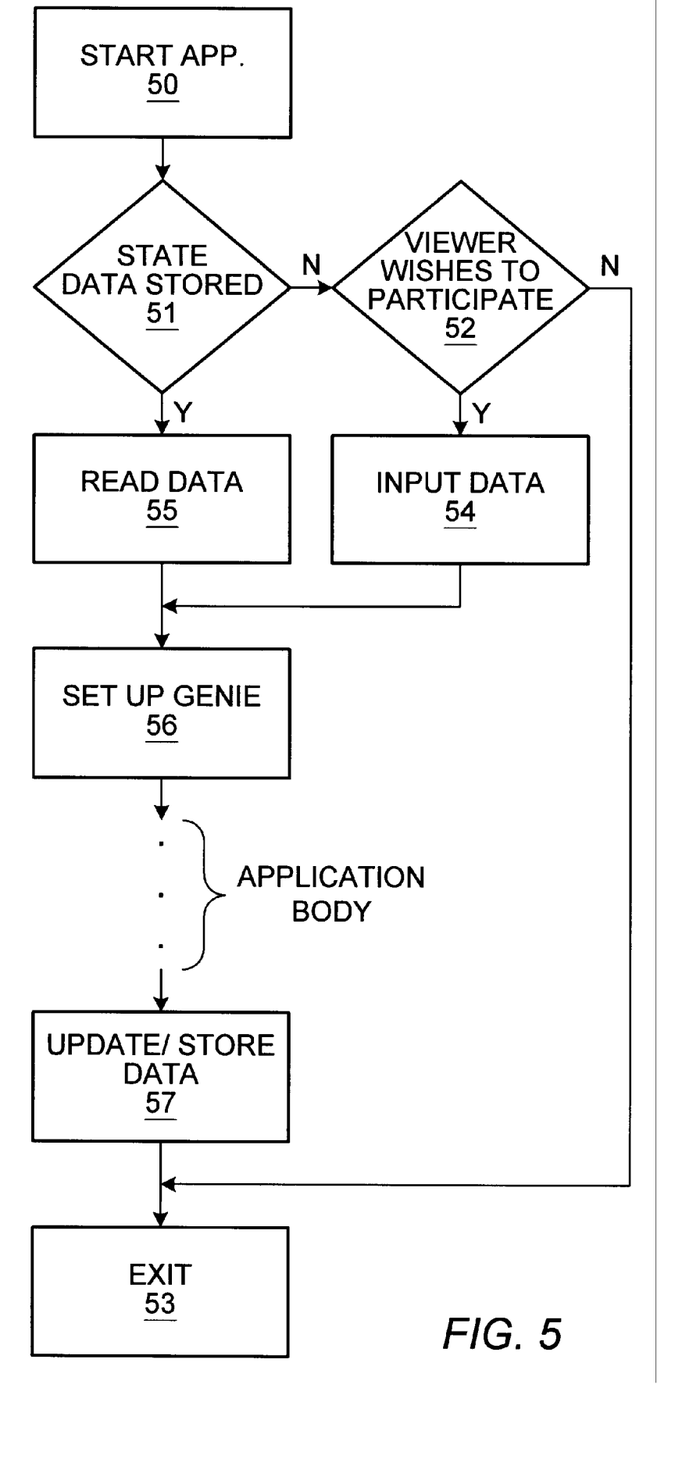
FIG. 5 is a flow diagram of the execution of an interactive application.

Referring to FIG. 5, a flow diagram of the execution of an interactive application is shown. At the start 50 of execution, the interactive application checks 51 for an existing data file. If there is no data file, the application queries 52 the viewer as to whether he or she wishes to set up the genie character. If the viewer does not wish to set up the application so that he or she can interact with it, the program terminates 53. If the viewer does wish to set up the application, the viewer is queried 54 for information relating to the characteristics of the genie character, such as name, hair color and type of clothing. This information, or genie data, is stored in a data file. The genie data is also contemplated to include information which relates the genie character to the viewer's viewing history. For example, the genie data may include a health index which reflects the amount of time the viewer spends watching the associated television program. The genie data may also include information on "special powers" which the genie character has obtained through the viewer's interaction with advertising promotions.

If, when the application is started 50, there is an existing data file, the interactive application will read 55 the data file to determine the state of the genie character at the last termination of an interactive genie application. The application will then set up 56 the genie character. Setting up 56 the genie may include various modifications to the genie data. For example, the application may compare the current date to the last date on which the associated program was viewed and adjust the genie character's health index upward or downward depending upon whether the elapsed time is greater or less than a certain value. If the health index increases, the genie character gets healthier, but if the health index drops below a certain value, the genie character can get sick or eventually die.

After the interactive application is initialized (i.e., the genie is set up according to the data stored in the set-top box or entered by the viewer), it will proceed to execute the body of the application code. The body of the application may vary as described herein and accordingly is not shown in detail in FIG. 5. After the body of the application is executed, the data associated with the genie is stored 57 so that it can be used in the execution of subsequent genie-related applications. After the data is stored 57, the application terminates 53.

It is contemplated the interactive application may perform a wide variety of functions, many of which are essentially aimed at comparing the viewer's activities to a set of standards which define "acceptable" levels of interaction. If the viewer meets the acceptable standards, the application-generated icon will be displayed in a pleasing or preferred state, but if the acceptable levels are not met, the icon will be made to appear in a less pleasing or preferred state. In the case of the genie described above, the preferred state is the healthy state and the less preferred state is the sick state.

The function of the application may be as simple as to display the genie character in a state which varies according to the time which has elapsed between successive viewings of the associated program, or it may be more complex and take into account more specific input from the viewer. For example, the application may prompt the viewer to take certain actions at a certain time. The application may inform the viewer that the genie character needs to eat or needs exercise. The viewer would then be required to press a certain button on a remote control to feed the genie or let it play. The application may reward the viewer for such interaction by making the genie character appear more healthy, by awarding points to the viewer's genie character or by giving the character special powers. The viewer can thereby act to maintain the genie character in a preferred (e.g., healthy) state, or by inaction allow the genie to revert to a less preferred (e.g., sick) state. The application will then modify the appearance of the genie to reflect its current state.

It is also contemplated that the interactive application may be designed to allow feedback to be conveyed from the viewer to the broadcast service provider. This feedback would utilize the return path described above. For example, the broadcast service provider could occasionally conduct a lottery in which a viewer's genie character is selected to be broadcast on the associated television program as a live character or as a cartoon character. The particular viewer's genie could be selected randomly from the group of set-top boxes for which a genie has been set up, or it could be selected based upon the genie's health or other characteristics which are collected from the set-top boxes. This information could be obtained by prompting the set-top boxes to provide immediate feedback via the return path, or it could be obtained from feedback collected from the set-top boxes over a period of time. If feedback from a particular set-top box is desired, the broadcast service provider can transmit a prompt or an application configured to retrieve the desired information directly to that set-top box. Alternatively, an application or prompt could be broadcast to all set-top boxes along with an identification code which allows only the selected set-top box to respond and transmit the desired information to the broadcast service provider. The genie could then be displayed on the associated television program and the viewer could be given an opportunity to contact the broadcast service provider to win a prize. Alternatively, the viewer could be granted a wish or awarded a prize based upon the number of points accumulated by the viewer's genie character.

Because particular manufacturers or service providers may sponsor promotions based upon the characteristics of the interactive applications' genies, there may be a need to implement security measures to ensure that the genie data in a given set-top box cannot be modified by the viewer. Accordingly, it is contemplated that unique identification codes may be associated with the applications or associated television programs so that only authorized accesses to the genie data can be made. These identification codes can be generated at the time an application or program is broadcast in order to prevent tampering with the codes. Additionally, the applications can be signed. If the operating system code of the set-top box checks file access based upon application certificates, access by unauthorized applications could thereby be prevented.

As noted above, the invention contemplates many variations which will be obvious to persons skilled in the art. For example, the television system may have a broadcast channel formed by a cable or by direct or satellite transmission, and it may have a return path formed by a pair of modems connected to a telephone line or by a portion of the bandwidth of the broadcast channel. Similarly, the genie character may be replaced by another cartoon character, computer-generated graphic, or other icon. Such variations are intended to be within the spirit and scope of the claimed invention.

Numerous variations and modifications will become apparent to those skilled in the art once the above disclosure is fully appreciated. It is intended that the following claims be interpreted to embrace all such variations and modifications.

What is claimed is:

1. A method for displaying an interactive, animated cartoon figure on a television comprising the steps of:

executing an interactive application in a set-top box coupled to said television;

setting up a plurality of user-defined attributes of said animated cartoon figure;

generating said animated cartoon figure on said television, said animated cartoon figure being representative of a living entity, said animated cartoon figure having an appearance indicative of a state of said figure;

prompting a viewer for a response;

updating said state, said state being a more preferred state if said viewer provides said response, said state being a less preferred state if said viewer fails to provide said response; and regenerating said animated cartoon figure on said television, said animated cartoon figure having said appearance indicative of said state of said animated cartoon figure.

2. The method of claim 1 further comprising the steps of:

storing said state of said animated cartoon figure in said set-top box; and terminating said interactive application.

3. The method of claim 2 further comprising the step of executing a second interactive application, said second interactive application being configured to load said state of said animated cartoon figure, generate said animated cartoon figure on said television, update said state, and regenerate said animated cartoon figure on said television.

4. An apparatus for use in an interactive television system having a broadcast station, a transmission medium and a display device, the apparatus being designed to promote viewer interaction with a television program, the apparatus comprising:

a signal processing unit configured to receive a program signal from said broadcast station, said program signal including said television program, a memory unit configured to store data used by an application, said data being indicative of a level of said viewer interaction, a microprocessor configured to execute said application, said application being configured to generate an icon, said icon being indicative of said level of said viewer interaction, said microprocessor further being configured to update said data in response to said viewer interaction, a display unit configured to combine said television program and said icon into a display signal and to transmit said display signal to said display device;

said icon being displayed in a preferred manner when said level of viewer interaction is high, and said icon being displayed in a non-preferred manner when said level of viewer interaction is low.

5. The apparatus of claim 4 wherein said application is configured to depict said icon as a living entity and wherein said preferred manner comprises a healthful manner, and wherein said non-preferred manner comprises an unhealthful manner.

6. The apparatus of claim 5 wherein said application is configured to accept user input and to customize said icon according to said user input.

7. The apparatus of claim 6 wherein said application is configured to depict said icon as a cartoon figure of a genie and wherein said application is configured to set one or more attributes of said cartoon figure of said genie according to said user inputs, said one or more attributes being selected from the group consisting of hair color, clothing color, clothing type and name.

8. The apparatus of claim 5 wherein said data includes a health index value and wherein said application is configured to depict said icon in a healthy manner when said health index value is greater than a predetermined value and in an unhealthy manner when said health index value is less than said predetermined value.

9. The apparatus of claim 8 wherein said application is configured to increase said health index value when said viewer watches one or more predetermined programs and wherein said application is configured to decrease said health index value when said viewer fails to watch said one or more predetermined programs.

10. The apparatus of claim 8 wherein said application is configured to prompt said viewer for a response and to increase said health index value if said viewer provides said response, said apparatus further comprising a remote control configured to enable said viewer to provide said response.

11. The apparatus of claim 4 wherein said television system further comprises a return path coupled to said set-top box and said broadcast station and wherein said application is configured to provide said data to said broadcast station via said return path.

12. The apparatus of claim 11 wherein said return path comprises a first modem coupled to said set-top box, a second modem coupled to said broadcast station and a telephone line coupled to said first and second modems, and wherein said application is configured to provide said data to said broadcast station in response to a prompt from said broadcast station.

13. The apparatus of claim 4 wherein said memory unit comprises a non-volatile random access memory and wherein said data is stored in said non-volatile random access memory.

14. The apparatus of claim 13 wherein said application comprises an initialization portion and a body portion, said application being configured to execute said initialization portion prior to said body portion, said initialization portion being configured to read said data from said non-volatile random access memory if said data exists and to generate said data if said data does not exist.

15. The apparatus of claim 4 wherein said set-top box is configured to execute said application upon receipt of said application from said broadcast station.

16. The apparatus of claim 4 wherein said set-top box further comprises a receiver configured to receive viewer input from a remote control.

17. A method for encouraging a plurality of viewers' participation in an interactive television system having a broadcast station and one or more receiving stations, each receiving station having a monitor, the method comprising the steps of:
    (a) transmitting a television program from said broadcast station to said one or more receiving stations;
    (b) performing steps (i)–(iii) one or more times for each receiving station;
        (i) detecting a level of participation of one of said viewers associated with said receiving station;
        (ii) generating an adaptable depiction of a living entity, said depiction having an appearance of a level of healthfulness corresponding to said level of said associated viewer's participation;
        (iii) displaying said television program and said depiction on said monitor; and
    (c) storing viewer data for each of said receiving stations, said viewer data being indicative of said level of each of said viewer's participation.

18. The method of claim 17 wherein said step of detecting said level of said viewer's participation comprises determining whether a data file containing said viewer data exists, reading said viewer data if said data file exists, and generating said viewer data if said data file does not exist.

19. The method of claim 18 wherein said step of detecting said level of said viewer's participation further comprises comparing one or more actions of said viewer to one or more corresponding standards and modifying said viewer data according to whether said one or more actions meet said one or more corresponding standards.

20. The method of claim 18 wherein said viewer data comprises an index value and wherein said step of detecting said level of said viewer's participation further comprises incrementing said index value when said viewer watches one or more predetermined portions of said television program and decrementing said index value when said viewer fails to watch said one or more predetermined portions of said television program.

21. The method of claim 20 wherein said step of detecting said level of said viewer's participation further comprises prompting said viewer for a response at a time unknown to said viewer, incrementing said index value when said viewer provides said response, and decrementing said index value when said viewer fails to provide said response.

22. The method of claim 21 further comprising the step of assigning special attributes to said depiction of said living entity when said viewer provides said response.

23. The method of claim 17 further comprising the steps of:
    transmitting a portion of said viewer data from each of said receiving stations to said broadcast station;
    selecting said viewer data from one of said receiving stations;
    transmitting to each of said receiving stations a selected depiction of said living entity corresponding to said selected viewer data from said one of said receiving stations; and
    awarding a prize to a selected viewer corresponding to said one of said receiving stations if said selected viewer contacts said broadcast station in response to said transmitting of said selected depiction.

24. The method of claim 23 wherein said step of transmitting said portion of said viewer data is performed in response to a prompt which is sent from said broadcast station only to said one of said receiving stations.

25. The method of claim 23
    wherein said step of transmitting said portion of said viewer data is performed in response to a prompt which comprises an identification code and which is sent from said broadcast station to each of said receiving stations and
    wherein said one of said receiving stations has a corresponding identification number which matches said identification code.

26. The method of claim 17 further comprising the steps of:
    transmitting an interactive application from said broadcast station to said plurality of receiving stations, said application being configured to perform steps (b)–(c), said interactive application having an authorization code associated therewith; and
    verifying said authentication code associated with said interactive application prior to said interactive application performing steps (b)–(c).

27. A method for encouraging viewer participation in a television system, said method comprising:
    generating an icon on a television, wherein said icon is indicative of a state corresponding to a first level of viewer participation;
    detecting a second level of participation of said viewer;
    updating said state of said icon to correspond to said second level of participation, in response to detecting said second level of participation; and
    regenerating said icon on said television, wherein said regenerated icon is indicative of said updated states;
    said icon being displayed in a preferred manner when said level of viewer interaction is high, and said icon being displayed in a non-preferred manner when said level of viewer interaction is low.

28. The method of claim 27, further comprising storing said state of said icon in a set-top box coupled to said television, and wherein said icon depicts a living entity, said preferred manner comprises a healthful manner, and said non-preferred manner comprises an unhealthful manner.

29. The method of claim 28, further comprising executing an interactive application, said interactive application being configured to:
    load said state of said icon;
    generate said icon on said television;
    update said state; and
    regenerate said icon on said television.

30. An apparatus for promoting viewer participation in a television system, said apparatus comprising:
    a signal processing unit configured to receive a television programming signal; and
    a control unit configured to generate an icon for display, wherein said icon is indicative of a level of viewer participation;
    said icon being generated for display in a preferred manner when said level of viewer participation is high, and said icon being generated for display in a non-preferred manner when said level of viewer participation is low.

31. The apparatus of claim 30, wherein said viewer participation comprises being tuned to a first program included in said programming signal.

32. The apparatus of claim 30, wherein said viewer participation comprises said viewer providing input to said apparatus.

33. The apparatus of claim 30 wherein said control unit comprises a microprocessor executing an application.

34. The apparatus of claim 33, further comprising a storage device, wherein said application is further configured to store data corresponding to said icon on said storage device, wherein said data is indicative of said level of viewer participation.

35. The apparatus of claim 34, wherein said application is configured to detect said stored data and generate said icon in a manner indicative of said level indicated by said stored data.

36. The apparatus of claim 33, wherein said icon depicts a living entity, and wherein said application is configured to depict said living entity in a more healthful manner when said level of said viewer participation is high and in a less healthful manner when said level of said viewer participation is low.

37. The apparatus of claim 36, wherein said entity has a corresponding health index value and wherein said application is configured to depict said entity in a healthy manner when said health index value is greater than a predetermined value and in an unhealthy manner when said health index value is less than said predetermined value.

38. The apparatus of claim 33, wherein said application is configured to customize said icon according to viewer preferences.

39. The apparatus of claim 38, wherein said application is configured to set one or more attributes of said entity according to said viewer preferences, said one or more attributes being selected from the group consisting of: hair color, clothing color, clothing type, and name.

40. The apparatus of claim 34, wherein said programming signal is conveyed from a broadcast station, and wherein said apparatus further comprises a return path coupled to said broadcast station, wherein said control unit is configured to provide said data to said broadcast station via said return path.

41. The apparatus of claim 33, wherein said application is received via a programming signal received by said signal processing unit.

42. The apparatus of claim 33, wherein said apparatus is coupled to a display device, and wherein a first program included in said programming signal and said icon are displayed concurrently.

43. A television system for increasing viewership comprising:
a broadcast station configured to broadcast a programming signal including a first program and an executable application, said application comprising program instructions executable to:
detect a level of viewer participation in a first program; and
generate an icon indicative of said level of participations;
said icon being displayed in a preferred manner when said level of viewer interaction is high, and said icon being displayed in a non-preferred manner when said level of viewer interaction is low.

44. The television system of claim 43, wherein said program instructions are further executable to store data corresponding to said icon on a storage device, wherein said data is indicative of said level of viewer participation.

45. The television system of claim 44, wherein said program instructions are further executable to generate said icon as depicting a living entity, and wherein said program instructions are executable to depict said living entity in a more healthful manner when said level of said viewer participation is high and in a less healthful manner when said level of said viewer participation is low.

46. The television system of claim 45, wherein said viewer participation comprises being tuned to said first program.

47. The television system of claim 45, wherein said viewer participation comprises said program instructions detecting input from said viewer.

48. A method for encouraging viewer participation in an interactive television system having a broadcast station and one or more receiving stations, each receiving station having a monitor, the method comprising:
transmitting a television program from said broadcast station to said one or more receiving stations;
detecting a level of participation of one of said viewers associated with said receiving station;
generating an icon having an attribute indicative of a level of said associated viewer's participation; and
displaying said television program and said icon on said monitor;
wherein detecting said level of said viewer's participation further comprises comparing one or more actions of said viewer to one or more corresponding standards and modifying said viewer data according to whether said one or more actions meet said one or more corresponding standards.

49. The method of claim 48, further comprising storing viewer data for each of said receiving stations, said viewer data being indicative of said level of each of said viewer's participation.

50. The method of claim 48, wherein detecting said level of said viewer's participation comprises determining whether a data file containing said viewer data exists, reading said viewer data if said data file exists, and generating said viewer data if said data file does not exist.

51. A method for encouraging viewer participation in an interactive television system having a broadcast station and one or more receiving stations, each receiving station having a monitor, the method comprising:
transmitting a television program from said broadcast station to said one or more receiving stations;
detecting a level of participation of one of said viewers associated with said receiving station;
generating an icon having an attribute indicative of a level of said associated viewer's participation; and
displaying said television program and said icon on said monitor;
wherein said viewer data comprises an index value and wherein detecting said level of said viewer's participation further comprises incrementing said index value when said viewer watches one or more predetermined portions of said television program and decrementing said index value when said viewer fails to watch said one or more predetermined portions of said television program.

52. The method of claim 51, wherein detecting said level of said viewer's participation further comprises prompting said viewer for a response at a time unknown to said viewer, incrementing said index value when said viewer provides said response, and decrementing said index value when said viewer fails to provide said response.

53. A method for encouraging viewer participation in an interactive television system having a broadcast station and one or more receiving stations, each receiving station having a monitor, the method comprising:

transmitting a television program from said broadcast station to said one or more receiving stations;

detecting a level of participation of one of said viewers associated with said receiving station;

generating an icon having an attribute indicative of a level of said associated viewer's participation;

displaying said television program and said icon on said monitor;

storing viewer data for each of said receiving stations, said viewer data being indicative of said level of each of said viewer's participation;

transmitting a portion of said viewer data from each of said receiving stations to said broadcast station;

selecting said viewer data from one of said receiving stations;

transmitting to each of said receiving stations a selected depiction of said icon corresponding to said selected viewer data from said one of said receiving stations; and awarding a prize to a selected viewer corresponding to said one of said receiving stations if said selected viewer contacts said broadcast station in response to said transmitting of said selected depiction.

54. The method of claim 53, wherein transmitting said portion of said viewer data is performed in response to a prompt which is sent from said broadcast station only to said one of said receiving stations.

55. The method of claim 53, wherein transmitting said portion of said viewer data is performed in response to a prompt which comprises an identification code and which is sent from said broadcast station to each of said receiving stations, and wherein said one of said receiving stations has a corresponding identification number which matches said identification code.

56. The method of claim 48, further comprising:

transmitting an interactive application from said broadcast station to said plurality of receiving stations, said application being configured to perform said transmitting, detecting, generating and displaying, said interactive application having an authorization code associated therewith; and verifying said authorization code associated with said interactive application prior to said interactive application performing said transmitting, detecting, generating and displaying.

57. A method for maintaining a viewer state in a television system comprising:

receiving a programming signal including a first program at a receiver;

executing a first application in said receiver, in response to detecting said first program;

generating a first data, wherein said first data indicates a viewer state corresponding to said first program;

storing said first data;

receiving a programming signal including a second program at said receiver;

executing a second application in said receiver, in response to detecting said second program;

retrieving said stored first data;

detecting said viewer state in said retrieved first data.

58. The method of claim 57, wherein said first application and said second application are the same application.

59. The method of claim 57, wherein said viewer state corresponds to a level of viewer participation.

60. The method of claim 57, wherein said viewer state includes a first attribute, said method further comprising displaying a first icon on a display coupled to said receiver, wherein said icon is indicative of said viewer state and said first attribute.

61. The method of claim 60, further comprising:

updating said viewer state to include a second attribute; and displaying a second icon on said display, wherein said second icon is indicative of said updated viewer state and said second attribute.

62. The method of claim 61, wherein said first icon and said second icon represent a living entity, and wherein said first attribute is a visual representation of a first level of health of said entity, and wherein said second attribute is a visual representation of a second level of health of said entity.

63. The method of claim 57, further comprising conveying said stored first data to a broadcast station via a return path.

64. An apparatus for maintaining a viewer state in a television system, said apparatus comprising:

a signal processing unit configured to receive a television programming signal; and a storage device; and a control unit, wherein said control unit is configured to:

execute a first application, in response to detecting a first program in a first programming signal received by said signal processing unit;

generate a first data, wherein said first data indicates a viewer state corresponding to said first program;

store said first data on said storage device;

execute a second application in said receiver, in response to detecting a second program in a second programming signal received by said signal processing unit;

retrieve said stored first data from said storage device; and detect said viewer state in said retrieved first data.

65. The apparatus of claim 64, wherein said viewer state includes a first attribute, and wherein said control unit is further configured to display a first icon on a display coupled to said apparatus, wherein said first icon is indicative of said viewer state and said first attribute.

66. The apparatus of claim 65, wherein said control unit is further configured to:

update said viewer state to include a second attribute; and display a second icon on said display, wherein said second icon is indicative of said updated viewer state and said second attribute.

67. The apparatus of claim 64, wherein said apparatus is coupled to a broadcast station via a return path, and wherein said control unit is configured to convey said stored first data to said broadcast station.

* * * * *